United States Patent
Bekri

(10) Patent No.: US 9,468,847 B2
(45) Date of Patent: Oct. 18, 2016

(54) TACTILE FEEDBACK GLOVES

(71) Applicant: UMM AL-QURA UNIVERSITY, Makkah (SA)

(72) Inventor: Mohammed Siraj Mohammed Bekri, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 212 days.

(21) Appl. No.: 14/266,683

(22) Filed: Apr. 30, 2014

(65) Prior Publication Data

US 2015/0314195 A1    Nov. 5, 2015

(51) Int. Cl.
*A63F 9/00*    (2006.01)
*A63F 13/285*    (2014.01)
*A63F 13/245*    (2014.01)

(52) U.S. Cl.
CPC ........... *A63F 13/285* (2014.09); *A63F 13/245* (2014.09)

(58) Field of Classification Search
None
See application file for complete search history.

(56) References Cited

U.S. PATENT DOCUMENTS

| | | | | |
|---|---|---|---|---|
| 5,143,505 A * | 9/1992 | Burdea | ................. | A61F 5/0118 244/234 |
| 5,184,319 A * | 2/1993 | Kramer | .................... | G06F 3/011 345/156 |
| 5,516,249 A * | 5/1996 | Brimhall | .................... | B25J 3/04 414/5 |
| 5,631,861 A * | 5/1997 | Kramer | .................... | B25J 13/02 414/5 |
| 5,858,291 A * | 1/1999 | Li | .......................... | B29C 70/882 264/105 |
| 5,963,331 A * | 10/1999 | Arai | ........................ | A61B 5/103 356/613 |
| 6,042,555 A * | 3/2000 | Kramer | ................... | A61B 5/225 600/595 |
| 6,049,327 A * | 4/2000 | Walker | .................... | G06F 3/014 345/158 |
| 6,110,130 A * | 8/2000 | Kramer | ................ | A61B 5/1071 600/587 |
| 6,413,229 B1 * | 7/2002 | Kramer | ................... | A61B 5/225 600/595 |
| 6,497,672 B2 * | 12/2002 | Kramer | ................ | A61B 5/1071 600/595 |
| 6,979,164 B2 * | 12/2005 | Kramer | .................... | B25J 13/02 340/407.1 |
| 7,138,976 B1 | 11/2006 | Bouzit et al. | | |

(Continued)

FOREIGN PATENT DOCUMENTS

| | | |
|---|---|---|
| CA | 2 460 698 A1 | 9/2005 |
| CN | 202844541 U | 4/2013 |

(Continued)

*Primary Examiner* — Seng H Lim
(74) *Attorney, Agent, or Firm* — Richard C. Litman

(57) ABSTRACT

The tactile feedback glove incorporates a plurality of pin actuators disposed inside the glove. Actuator pins point towards bottom surfaces of a user's hand inside the glove. A plurality of pivotally attached joint members is disposed inside the glove. The joint members are arranged proximately above top surfaces of a user's hand inside the glove. The pin actuators have a rectangular actuator body with bores sunk through a parallelepiped actuator body surface and arranged in a row-by-column matrix formation of solenoid cores in the bores. The pins slide up and down inside sleeves extending from the solenoid cores. The extent of each pin outside its respective bore is responsive to current flow in the solenoid core. The joint members are arranged above a user's intermediate, proximal, and distal phalanges. Motor control of the joint members determines the angular displacement of the joints directing and limiting hand motion inside the glove.

7 Claims, 6 Drawing Sheets

(56) References Cited

U.S. PATENT DOCUMENTS

| | | | |
|---|---|---|---|
| 7,250,935 B2 * | 7/2007 | Kubota | G06F 3/016 345/156 |
| 8,125,448 B2 | 2/2012 | Ranta et al. | |
| 8,622,939 B2 * | 1/2014 | Nguyen | A61H 1/0288 482/44 |
| 2001/0043847 A1 * | 11/2001 | Kramer | B25J 13/02 414/5 |
| 2002/0146672 A1 * | 10/2002 | Burdea | A63B 23/16 434/258 |
| 2005/0285853 A1 | 12/2005 | Morita et al. | |
| 2008/0068376 A1 | 3/2008 | Anderson et al. | |
| 2010/0073150 A1 | 3/2010 | Olson et al. | |
| 2011/0302694 A1 * | 12/2011 | Wang | A61B 5/103 2/160 |
| 2012/0126972 A1 | 5/2012 | Rott et al. | |
| 2012/0157263 A1 * | 6/2012 | Sivak | A61H 1/0285 482/4 |
| 2012/0182135 A1 * | 7/2012 | Kusuura | G06F 3/00 340/407.1 |
| 2014/0336669 A1 * | 11/2014 | Park | A61B 19/2203 606/130 |
| 2014/0349762 A1 * | 11/2014 | Haas | A63F 13/24 463/37 |

FOREIGN PATENT DOCUMENTS

| | | |
|---|---|---|
| GB | 2 254 911 A | 10/1992 |
| GB | 2 263 179 A | 7/1993 |
| WO | WO 92/05519 A1 | 4/1992 |
| WO | WO 96/02878 A1 | 2/1996 |

* cited by examiner

TACTILE FEEDBACK GLOVES

BACKGROUND OF THE INVENTION

1. Field of the Invention

The present invention relates to simulation gloves for video and computer games, and particularly to tactile feedback gloves incorporating motor-controlled joints and actuator-controlled pressure pins.

2. Description of the Related Art

Efforts have been made to simulate tactile pressure and limited joint motion that occurs during "natural" use of a hand. The simulation efforts are generally in support of telerobotic control, in which it is desirable to have an operator "feel" robotic hand and finger motions as the operator manipulates real or virtual objects with a controller. Examples of manual controllers using levers, grippers, handles and the like, some of which apply force feedback, abound. These types of controllers are not without their drawbacks. Hence, there has been long recognized a need for "natural" dexterous controllers with haptic feedback.

Thus, tactile feedback gloves solving the aforementioned problems is desired.

SUMMARY OF THE INVENTION

The tactile feedback gloves each incorporate a plurality of pin actuators disposed inside the glove. The pin actuators point towards bottom surfaces of a user's hand inside the glove. A plurality of pivotally attached joint members is also disposed inside the glove. The joint members are arranged proximately above top surfaces of a user's hand inside the glove. The pin actuators have a rectangular actuator body with bores sunk through a parallelepiped actuator body surface and arranged in a row-by-column matrix formation of solenoid cores in the bores. The pins slide up and down inside sleeves extending from the solenoid cores. The extent of each pin outside its respective bore is responsive to current flow in the solenoid core. The joint members are arranged above a user's intermediate, proximal, and distal phalanges. Motor control of the joint members determines the angular displacement of the joints, thereby directing or limiting motion of the user's hand inside the glove.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
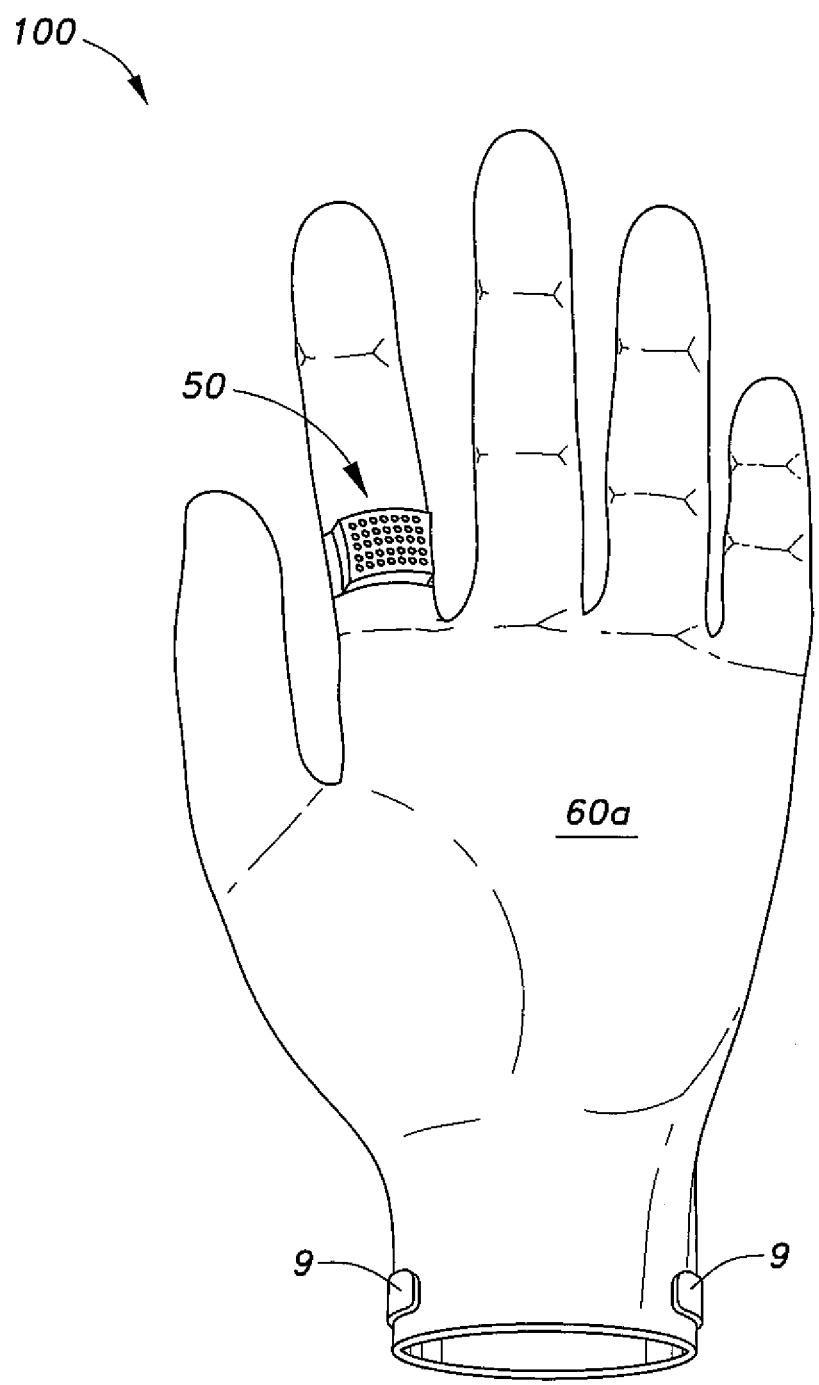
FIG. 1 is a perspective view of the palm-side of a tactile feedback glove according to the present invention.

The tactile feedback glove 100 incorporates a plurality of pin actuators 50 disposed on palmar portions 60a of the glove 100. FIG. 1 shows a single pin actuator 50 disposed on the glove 100 for clarity in the drawing, but it should be understood that the plurality of pin actuators 50 may be disposed on top or underneath any portion of, or all portions of, the palmar glove surfaces 60a. Actuators 50 are attached to the palmar portions 60a such that the pins 40 (shown in FIG. 3) of the actuators 50 point towards and selectively stimulate pressure nerves of the palmar finger surfaces of a user's hand when the glove 100 is worn on the user's hand. It is contemplated that both right-hand and left-hand gloves may be provided.

Figure 3:
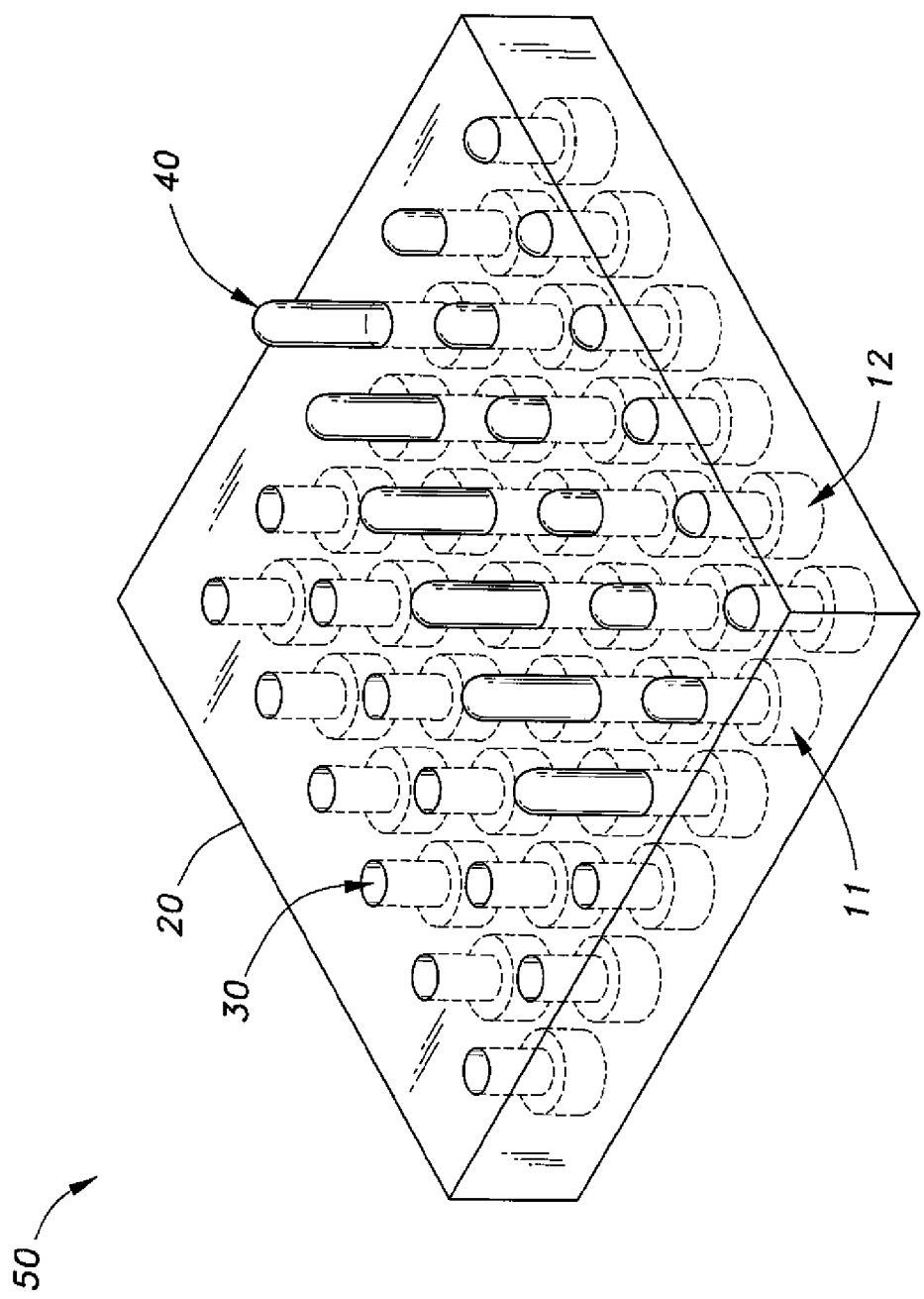
FIG. 3 is a perspective view of the pin actuator of the tactile feedback glove according to the present invention.

As most clearly shown in FIG. 3, each pin actuator 50 comprises a rectangular actuator body 20 having blind bores 30 sunk through one surface thereof, extending through a portion of actuator body 20, the bores 30 being arranged in a matrix formation of rows 11 and columns 12 of solenoid cores, each solenoid core being disposed in its respective bore 30 and having a sleeve extending therefrom. The pins 40 are disposed in the sleeves of the solenoid cores 11 and 12 and are coaxially constrained to slide up and down responsive to currents in the solenoid cores 11 and 12. The extent of each pin 40 outside its respective bore 30 is responsive to the intensity of actuation of the solenoid core within the bore 30. While the embodiment shown utilizes electromechanical solenoid core actuation, other forms of actuation, such as compressed air, are contemplated.

Figure 2:
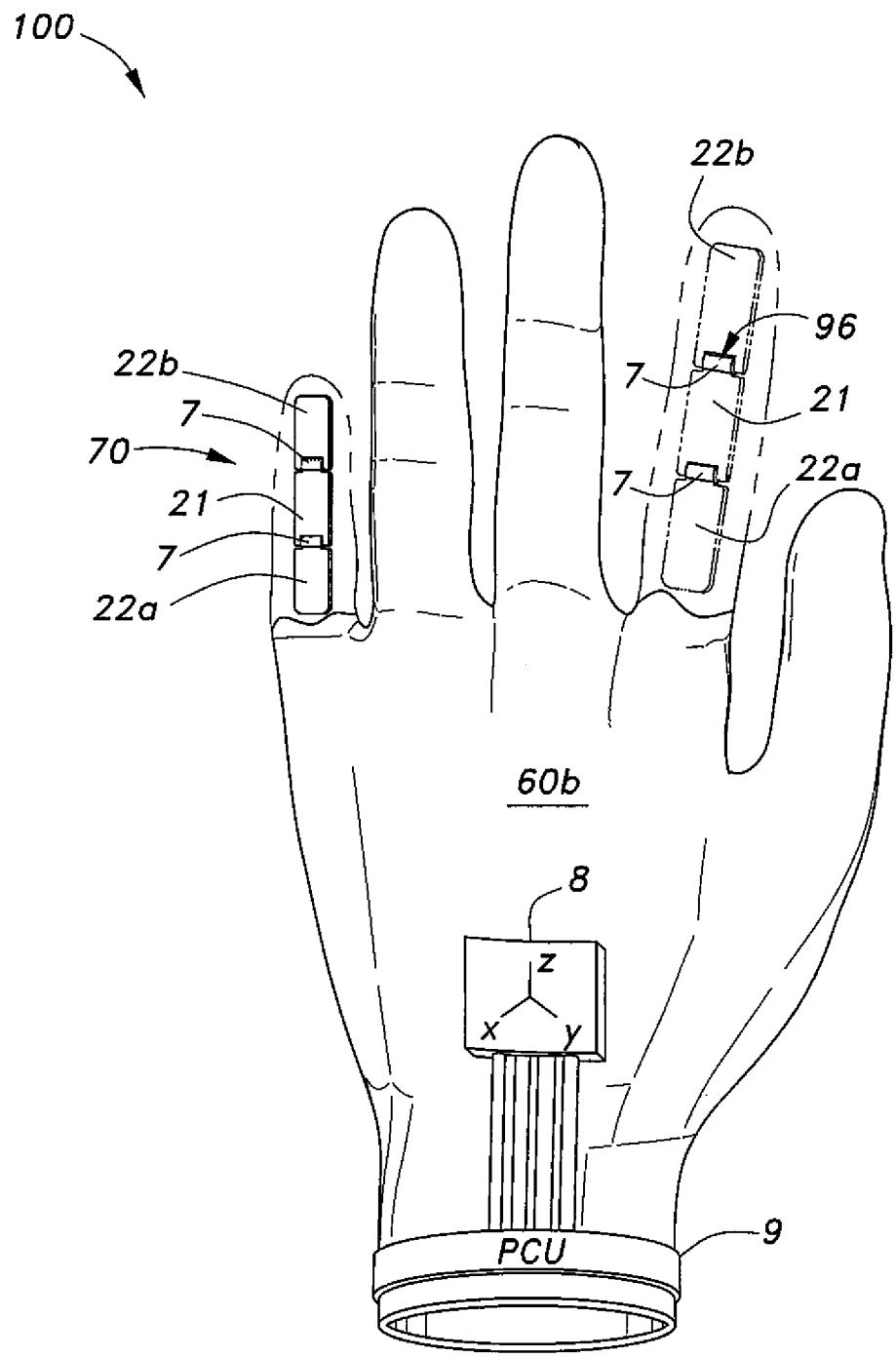
FIG. 2 is a perspective view of the back-side of a tactile feedback glove according to the present invention.

As shown in FIG. 2, a plurality of pivotally attached joint members 70 is disposed on dorsal portions 60b of the glove 100. The joint members 70 are arranged proximate the dorsal finger joint surfaces (intermediate, proximal, and distal phalanges) of a user's hand inside the glove 100. Planar joint member 22a is positioned on the glove 100 over the dorsal portion of the user's proximal phalange when the glove 100 is worn on the user's hand. Planar joint member 21 is positioned on the glove 100 over the dorsal portion of the user's intermediate phalange when the glove 100 is worn on the user's hand. Planar joint member 22b is positioned on the glove 100 over the dorsal portion of the user's distal phalange when the glove 100 is worn on the user's hand.

Figure 4A:
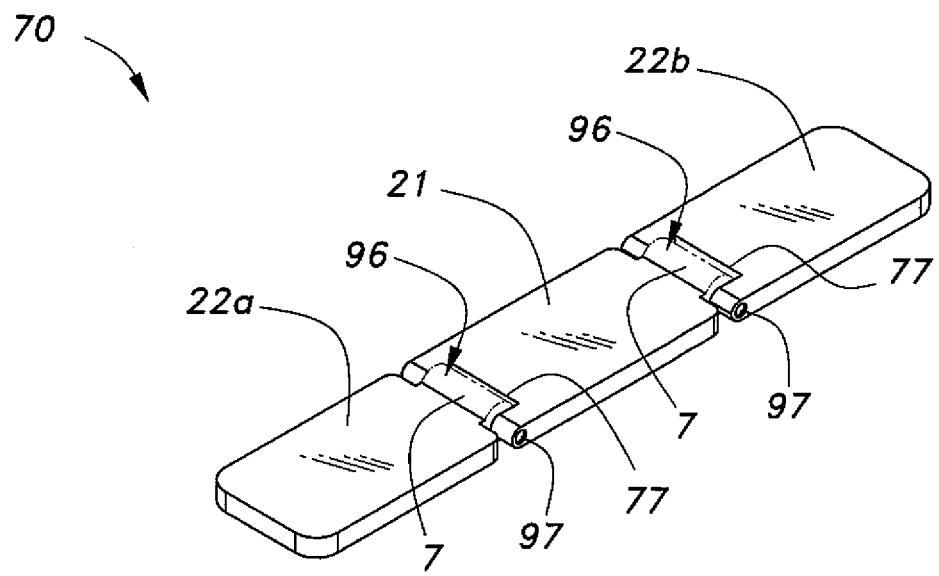
FIG. 4A is a perspective view of a joint member of the tactile feedback glove according to the present invention in a relaxed configuration.
Figure 4B:
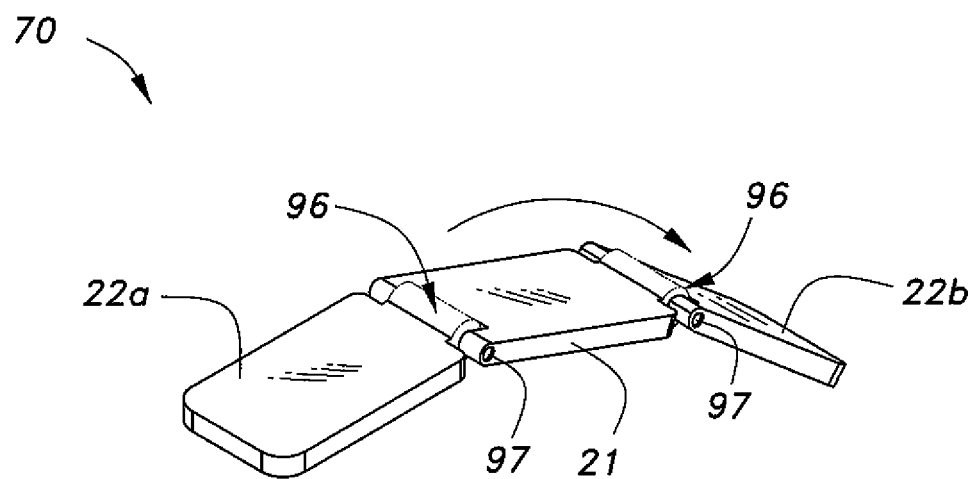
FIG. 4B is a perspective view of a joint member of the tactile feedback glove according to the present invention in a prehensile configuration.
Figure 5:
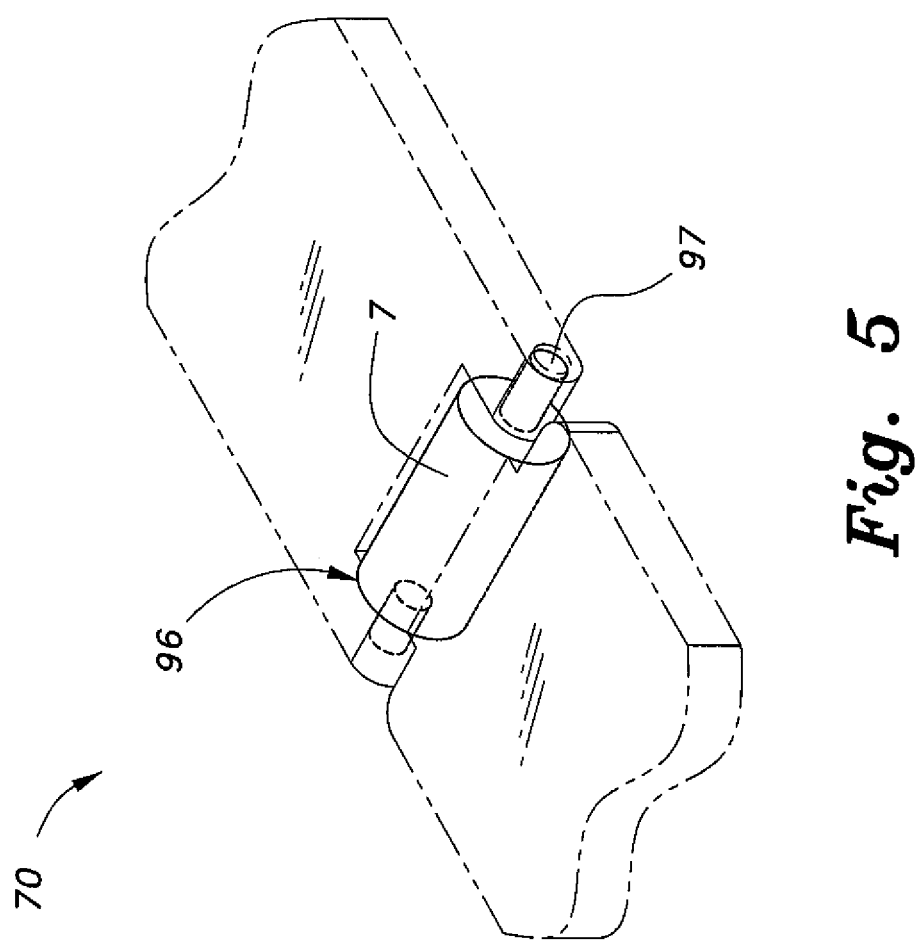
FIG. 5 is a perspective view of a joint member control motor of the tactile feedback glove according to the present invention.

As most clearly shown in FIGS. 4A and 4B, the housing of a joint drive motor 96 is attached to the distal end of the planar joint member 22a. Details of the motor 96 and pivotal joint connection via shaft 97 are shown in FIG. 5. The shaft 97 of the joint drive motor 96 forms the pivot axis of a pivotal connection to the proximal end of planar joint member 21. A recess 77 in the proximal end of planar joint member 21 allows for clearance of the cylindrical housing of the motor 96, thereby permitting the joint member 21 to rotate about the pivot axis formed by the attachment to joint member 22a. The rotational position of the motor shaft 97 determines the angular displacement of joint 21 with respect to joint 22a, thereby directing or limiting motion of the user's intermediate phalange with respect to his/her proximal phalange.

The housing of another joint drive motor 96 is attached to the distal end of planar joint member 21. The shaft 97 of the joint drive motor 96 forms the pivot axis of a pivotal connection to the proximal end of planar joint member 22b. A recess 77 in the proximal end of planar joint member 22b allows for clearance of the cylindrical housing of motor 96, thereby permitting the joint member 22b to rotate about the pivot axis formed by the attachment of joint member 21 to joint member 22b. The rotational position of the motor shaft 97 determines the angular displacement of joint 22b with respect to joint 21, thereby directing or limiting motion of the user's distal phalange with respect to his/her intermediate phalange.

With respect to sensing of the joint angular displacements, this technology is described in U.S. Patent Publication No. 2012/0157263, published on Jun. 21, 2012, which is hereby incorporated by reference in its entirety. In the present glove 100, the angle sensors 7 (shown in FIGS. 2, 4A, and 5) are preferably integrated on or within the cylindrical housing of the motors 96. Spatial positioning, e.g., pitch, roll and yaw of the glove 100 (as determined by the position and tilt or attitude of the user's hand) is detected by an X-Y-Z sensor 8, which is disposed on a proximal region of the glove's dorsal surface 60b, and which is connected to a processing and control unit (PCU) 9, as shown in FIG. 2. The PCU 9 can then report the hand position and/or attitude with respect to a virtual environment, such as an electronic game, remote teleoperation environment, and the like.

Figure 6:
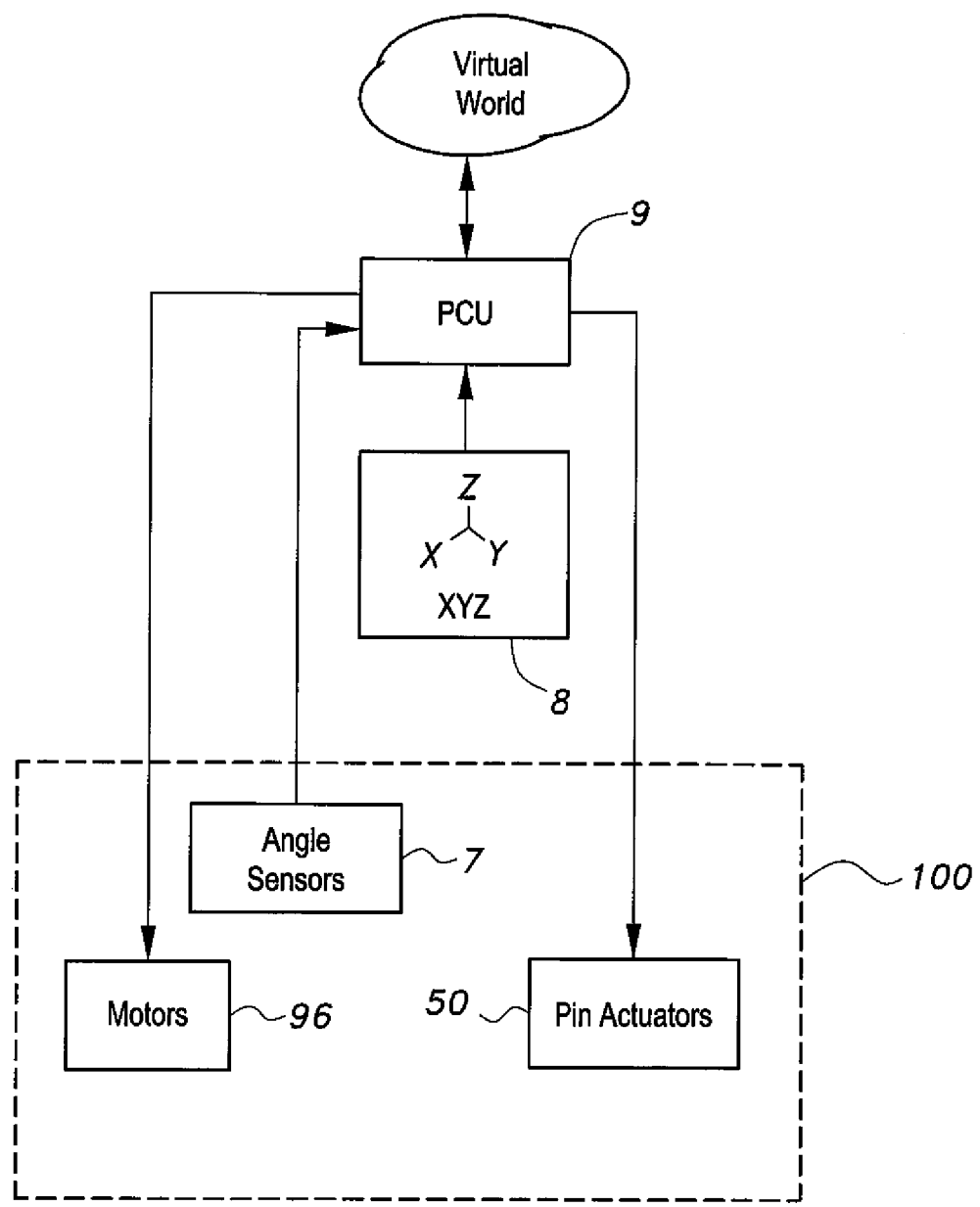
FIG. 6 is a block diagram of tactile feedback and control elements of the tactile feedback glove according to the present invention.

As shown in FIG. 6, processing and control unit (PCU) 9 is connected to angle sensors 7 for determining the joint angles. The PCU 9 is connected to the X-Y-Z sensor 8 for determining spatial positioning, i.e., the pose of the glove 100. Based on inputs from the virtual world, the joint angle sensors 7 and the X-Y-Z sensor 8, the PCU 9 commands desired joint angles and their limits. The motor 96 may have a gear stop formed by a small, e.g., micro-electromechanical solenoid to halt joint motion on command from the PCU 9. For virtual touch sensation, the PCU 9, being connected to the pin actuators 50, controls the pin actuators 50 to regulate the extension of the actuator pins 40.

It is to be understood that the present invention is not limited to the embodiments described above, but encompasses any and all embodiments within the scope of the following claims.

I claim:

1. A tactile feedback glove, comprising:
   a glove having palmar portions and dorsal portions;
   a plurality of pin actuators disposed on the palmar portions of the glove, the pin actuators being adapted for pointing towards and selectively stimulating pressure nerves of palmar surfaces of a user's hand inside the glove, wherein each of the pin actuators consists of:
   i) a parallelepiped actuator body having blind bores sunk through one surface thereof and extending through a portion of the actuator body, the bores being arranged in a row-by-column matrix formation;
   ii) solenoid cores having sleeves extending therefrom, each solenoid core/sleeve being disposed in a respective bore; and
   iii) pins slidably disposed coaxially inside the solenoid core sleeves, the extension of each pin outside its respective bore being responsive to current flow in its respective solenoid core;
   a plurality of pivotally attached joint members disposed on the dorsal portions of the glove, the joint members consist of first, second, and third joint members adapted for being arranged proximate the dorsal finger joint surfaces (proximal, intermediate, and distal phalanges, respectively) of a user's hand inside the glove and adjustable via actuation to control/limit joint motion of the user's hand inside the glove, wherein the first, second, and third pivotally attached joint members are rectangular and planar and are aligned with the fingers of the user's hand;
   a first joint drive motor attached to a distal end of the first pivotally attached joint member, the first joint drive motor consisting of a drive shaft forming a pivot axis of a pivotal connection to a proximal end of the second pivotally attached joint member, the second pivotally attached joint member having a recess defined in the proximal end of the second joint member, the recess allowing for clearance of a cylindrical housing of the first drive joint motor, thereby permitting the second joint member to rotate about the pivot axis formed by the attachment to the first joint member, the rotational position of the first drive joint motor shaft determining the angular displacement of the second joint member with respect to the first joint member, thereby being adapted for directing and limiting motion of the user's intermediate phalange with respect to his/her proximal phalange inside the glove; and
   a second joint drive motor attached to the distal end of the second pivotally attached joint member, the second joint drive motor consisting of a drive shaft forming a pivot axis of a pivotal connection to proximal end of the third pivotally attached joint member, the third joint member having a recess defined in the proximal end, the recess allowing for clearance of a cylindrical housing of the second drive joint motor, thereby permitting the third joint member to rotate about the pivot axis formed by the attachment to the second joint member, the rotational position of the second drive joint motor shaft determining the angular displacement of the third joint member with respect to the second joint member, thereby being adapted for directing and limiting motion of the user's distal phalange with respect to his/her intermediate phalange inside the glove.

2. The tactile feedback glove according to claim 1, wherein the glove is a right-handed glove.

3. The tactile feedback glove according to claim 1, wherein the glove is a left-handed glove.

4. The tactile feedback glove according to claim 1, further comprising a processing and control unit (PCU) connected to the pin actuators and commanding the pins to extend and retract, thereby giving a wearer of the tactile feedback glove touch sensation of virtual objects input to the PCU.

5. The tactile feedback glove according to claim 4, further comprising joint angle sensors attached to the joint members, the joint angle sensors being connected to the PCU and reporting to the PCU the angular displacement of each of the joint members with respect to its adjacent joint member.

6. The tactile feedback glove according to claim 5, further comprising a connection between the PCU and the joint drive motors for sending commands to direct and limit motion of the user's fingers inside the glove, the commands being responsive to the joint member angular displacements reported to the PCU and to virtual inputs received by the PCU.

7. The tactile feedback glove according to claim 6, farther comprising an X-Y-Z sensor attached to the glove, the X-Y-Z sensor being connected to the PCU and reporting the glove wearer's hand pose with respect to the virtual inputs received by the PCU.

* * * * *